(12) United States Patent
Liu et al.

(10) Patent No.: US 8,442,049 B2
(45) Date of Patent: May 14, 2013

(54) BASE STATION AND ATTACHING METHOD THEREOF

(75) Inventors: Shu-Tsz Liu, Taipei (TW); Chih-Chiang Wu, Shalu Township (TW); Kanchei Loa, Taipei (TW)

(73) Assignee: Institute for Information Industry, Taipei (TW)

( * ) Notice: Subject to any disclaimer, the term of this patent is extended or adjusted under 35 U.S.C. 154(b) by 395 days.

(21) Appl. No.: 12/821,861

(22) Filed: Jun. 23, 2010

(65) Prior Publication Data

US 2010/0322148 A1 Dec. 23, 2010

Related U.S. Application Data

(60) Provisional application No. 61/219,381, filed on Jun. 23, 2009.

(51) Int. Cl.
*H04L 12/28* (2006.01)

(52) U.S. Cl.
USPC .......................................... 370/392; 370/401

(58) Field of Classification Search ........................ None
See application file for complete search history.

(56) References Cited

U.S. PATENT DOCUMENTS

| | | | |
|---|---|---|---|
| 2003/0214925 A1 | 11/2003 | Diaz Cervera et al. | |
| 2004/0097240 A1* | 5/2004 | Chen et al. | 455/450 |
| 2006/0083191 A1 | 4/2006 | Niwano et al. | |
| 2007/0280149 A1* | 12/2007 | Takahashi et al. | 370/328 |
| 2008/0310367 A1* | 12/2008 | Meylan | 370/331 |
| 2010/0260096 A1* | 10/2010 | Ulupinar et al. | 370/315 |
| 2010/0296448 A1* | 11/2010 | Vainikka et al. | 370/328 |
| 2011/0044279 A1* | 2/2011 | Johansson et al. | 370/329 |
| 2012/0002594 A1* | 1/2012 | Racz et al. | 370/315 |

FOREIGN PATENT DOCUMENTS

| | | |
|---|---|---|
| CN | 1461152 A | 12/2003 |
| CN | 1751534 A | 3/2006 |
| CN | 101321383 A | 12/2008 |
| WO | 2007102953 A1 | 9/2007 |

OTHER PUBLICATIONS

Office Action for Chinese counterpart application to the present US application, Aug. 1, 2012, 8 pages (including translation).

* cited by examiner

*Primary Examiner* — Eunsook Choi
(74) *Attorney, Agent, or Firm* — Skaar Ulbrich Macari, P.A.

(57) ABSTRACT

A base station and an attaching method thereof are provided. A relay network system comprises the base station, a relay station and a core network. The base station is connected with the core network via a backhaul link. The base station comprises a processing unit and a transceiver. The processing unit is configured to setup a communication link procedure between the relay station and the core network corresponding to a link request from the relay station, and to create a mapping table for connecting the relay station and the core network. The transceiver is configured to forward network packets and control signals between the relay station and the core network based on the mapping table.

16 Claims, 12 Drawing Sheets

BASE STATION AND ATTACHING METHOD THEREOF

PRIORITY

This application claims the benefit of U.S. Provisional Application Ser. No. 61/219,381 filed on Jun. 23, 2009, which is incorporated by reference herein in its entirety.

FIELD

The present invention relates a base station and an attaching method thereof. More particularly, the base station and the attaching method thereof of the present invention are for use in a network system which supports relay nodes.

BACKGROUND

Wireless network technologies are commonly and widely used in nowadays. In order to provide better qualities of service and wider communication ranges between the wireless apparatus, the concept of relay station has been introduced in network systems.

The purpose of deploying relay station in network system is to extend the serving coverage of base station; hence, mobile station which is not within the communication coverage of base station can access the services provided by relay station as well via base station.

However, in some developing network systems, the hardware modules, protocol stacks and communicating procedures for the network architectures with relay stations are not efficiently developed yet. For example, in IEEE 802.16j network systems, L2 relay used for the relaying communication are inflexible and inefficient.

Therefore, since the hardware modules, protocol stacks and communication procedures used in the latest network systems are still developed, better proposals of the system architectures and communicating methods are needed.

SUMMARY

An objective of certain embodiments of the present invention is to provide an attaching method for use in a base station (BS). The BS is adapted for use in a network system. The network system comprises the BS, a relay station (RS) and a core network (CN). The BS is connected with the CN via a backhaul link. The attaching method comprises the steps of (a) enabling the BS to setup a communication link procedure between the RS and the CN corresponding to a link request from the RS; (b) enabling the BS to create a mapping table for connecting the RS and the CN after step (a); and (c) enabling the BS to forward network packets and control signals between the RS and the CN based on the mapping table.

Another objective of certain embodiments of the present invention is to provide a base station (BS) for use in a network system. The relay network system comprises the BS, a relay station (RS) and a core network (CN). The BS is connected with the CN via a backhaul link. The BS comprises a processing unit and a transceiver. The processing unit is configured to setup a communication link procedure between the RS and the CN corresponding to a link request from the RS, and to create a mapping table for connecting the RS and the CN. The transceiver is configured to forward and receive network packets and control signals between the RS and the CN based on the mapping table.

Based on the above disclosures, the base station, attaching methods and identifying mechanisms of the present invention can solve the problems caused in the prior art, and improve the efficiency of the communications in the latest network systems.

The detailed technology and preferred embodiments implemented for the subject invention are described in the following paragraphs accompanying the appended drawings for people skilled in this field to well appreciate the features of the claimed invention. It is understood that the features mentioned hereinbefore and those to be commented on hereinafter may be used not only in the specified combinations, but also in other combinations or in isolation, without departing from the scope of the present invention.

Figure 1A:
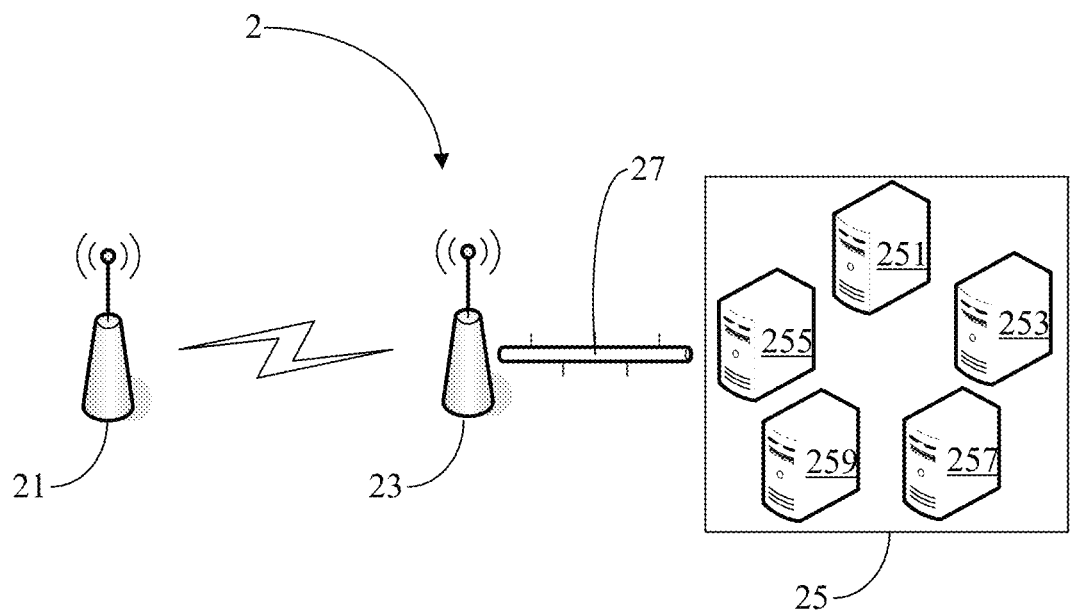
FIG. 1A illustrates a network system of a first example embodiment of the present invention.

While the invention is amenable to various modifications and alternative forms, specifics thereof have been shown by way of example in the drawings and will be described in detail. It should be understood, however, that the intention is not to limit the invention to the particular example embodiments described. On the contrary, the invention is to cover all modifications, equivalents, and alternatives falling within the spirit and scope of the invention as defined by the appended claims.

DETAILED DESCRIPTION

In the following descriptions, the present invention will be explained with reference to various example embodiments; nevertheless, these embodiments are not intended to limit the present invention to any specific example, environment, applications, or particular implementations described in these example embodiments. Therefore, descriptions of these example embodiments are only provided for purpose of illustration rather than to limit the present invention. It should be appreciated that elements unrelated directly to the present invention are omitted from the embodiments and the attached drawings.

FIG. 1A illustrates a first example embodiment of the present invention, which is a network system 2. The network system 2 comprises a relay station (RS) 21, a base station (BS) 23, and a core network (CN) 25. The RS 21 connects with the BS 23 wirelessly, and the BS 23 connects with the CN 25 via a backhaul link 27. It should be noted that, for the convenience to understand the present invention more clearly, it is presumed that the network system 2 conforms to the long term evolution (LTE) standard. For example, in this embodiment, the BS 23 may be a donor evolved Node B, the RS 21 may be named as a relay node (RN) or a Relay E-UTRAN NodeB (Relay eNB or ReNB), and the CN 25 is an Evolved Packet Core (EPC) which may comprise a first mobility management entity (MME) 251, a home subscribe server (HSS) 253, a second MME 255, an operation and maintenance (O&M) system 257, a Serving Gateway (S-GW) 259. However, it is not intended to limit this invention to any specific environment. It should be noted that different organizations and/or companies name the relay station, base station, and core network of the LTE standard in different ways; hence, the above specific names of the RS 21, BS 23, and CN 25 are not intended to limit the scopes of the present invention.

Figure 1B:
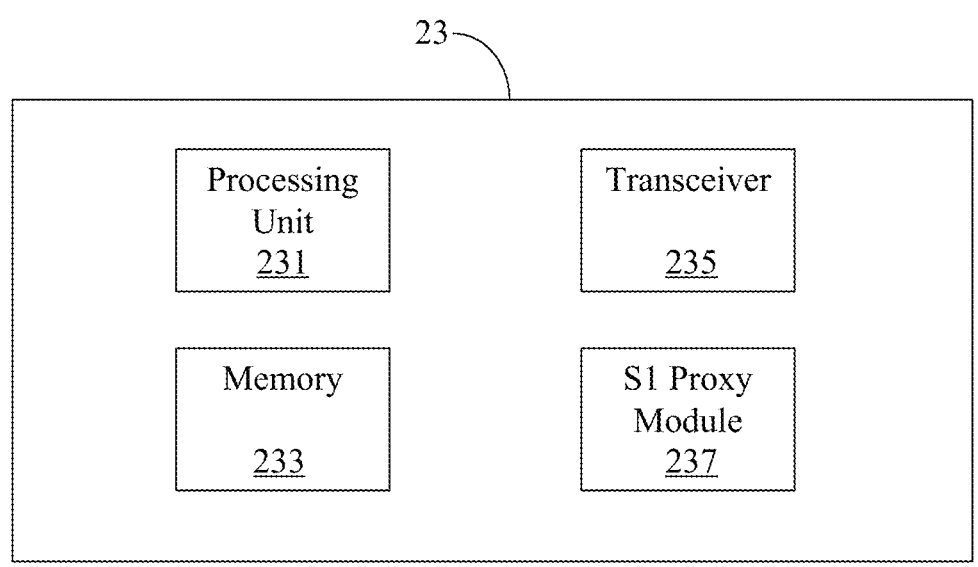
FIG. 1B illustrates a schematic view of the base station of the first example embodiment.

The BS 23 comprises a processing unit 231, a memory 233, a transceiver 235 and a S1 proxy module 237 as drawn in FIG. 1B. The processing unit 231 may be any of various processors, central processing units (CPUs), microprocessors, or other computing devices known to people skilled in the art. In addition, the memory 233 may be any kind of various storage mediums and the transceiver 235 may be any of various transceivers that known to people skilled in the art.

Figure 1C:
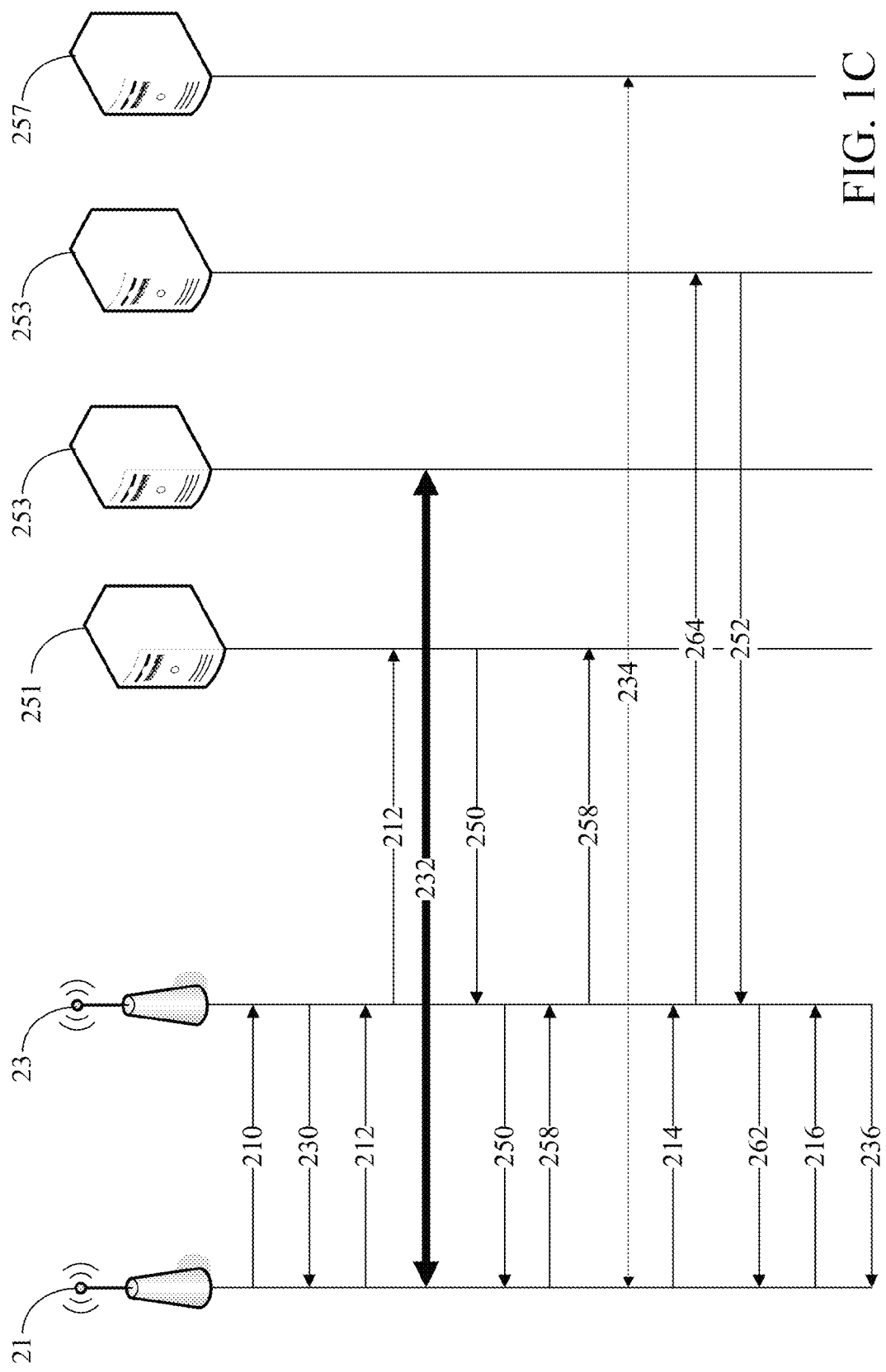
FIG. 1C illustrates the signal flows of an example in the first example embodiment.

Next, please refer to FIG. 1C at the same time. At first, the transceiver 235 of the BS 23 receives a link request from the RS 21. Then, the processing unit 231 of the BS 23 sets up a communication link procedure between the RS 21 and the CN 25 based on the link request. Specifically, the link request that the transceiver 235 of the BS 23 receives from the RS 21 is a radio resource control (RRC) request 210 which is a signaling message for requesting to setup the communication link procedure between the RS 21 and the CN 25. After receiving the RRC request 210, the processing unit 231 of the BS 23 is configured to respond a RRC connection 230 to the RS 21.

Afterwards, the transceiver 235 of the BS 23 receives a non-access stratum (NAS) attach request 212 from the RS 21, and forward the NAS attach request 212 to the first MME 251 of the CN 25. Next, the BS 23 sets up an authentication link 232 between the RS 21 and the HSS 253 of the CN 25. After building up the authentication link 232, the BS 23 receives a NAS attach accept 250 from the first MME 251 of the CN 25 according to the NAS attach request 212 and forwards the NAS attach accept 250 directly to the RS 21. It should be noted that, in order to activate an evolved packet system (EPS) bearer between the RS 21 and the CN 25, the NAS attach accept 250 can further comprises an EPS bearer activation request. Therefore, after the RS 21 receives and accepts the NAS attach accept 250 from the first MME 251 of the CN 25, the RS 21 replies a NAS attach complete 258 to the first MME 251 of the CN 25 via the BS 23. Similarly, the NAS attach complete 258 comprises an EPS bearer activation response so that the EPS bearer can be activated between the RS 21 and the CN 25.

Subsequently, the processing unit 231 of the BS 23 sets up a internet protocol (IP) link (not shown) between the RS 21 and the CN 25 for exchanging configurations. Accordingly, the transceiver 235 of the BS 23 can receive a configuration data 234 from the O&M system 257 of the CN 25 and forward the configuration data directly to the RS 21. Following, S1 messages can be update between the RS 21 and the CN 25 after the creation of S1 interface.

Figure 1D:
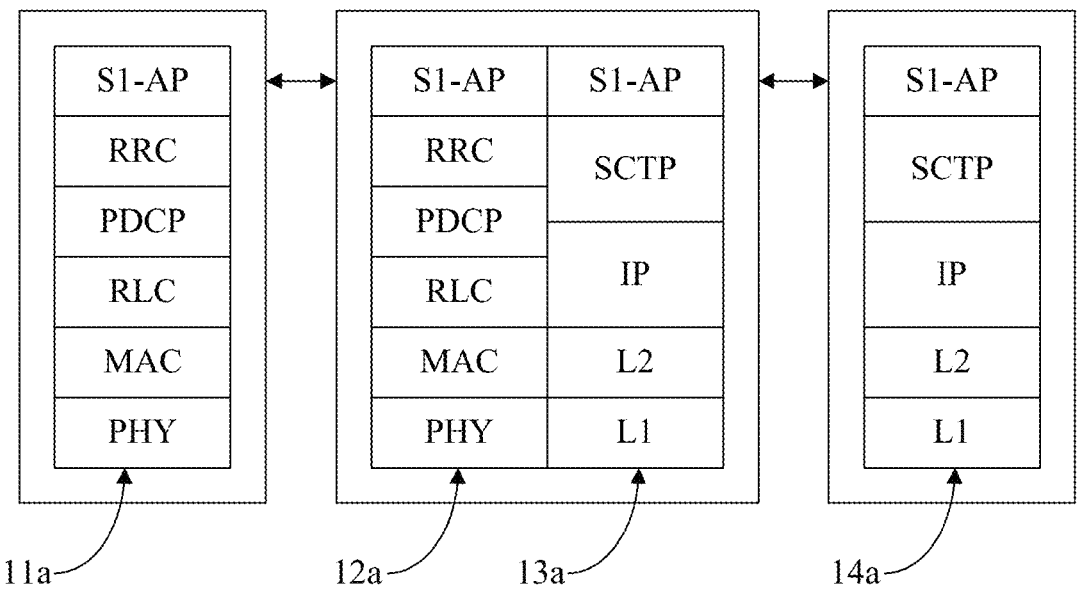
FIG. 1D illustrates a pattern of control plane protocol stacks of the network system of the first example embodiment.
Figure 1E:
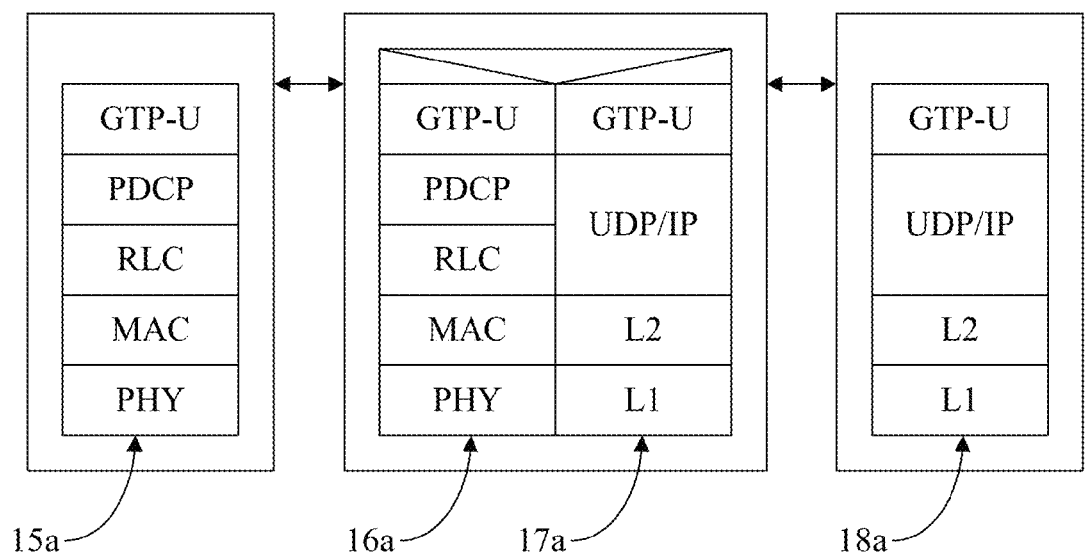
FIG. 1E illustrates a pattern of user plane protocol stacks of the network system of the first embodiment.

Please refer to FIGS. 1D and 1E at the same time, the possible protocol stacks used in the first embodiment. FIG. 1D represents a pattern of control plane protocol stacks of the network system 2 of the present invention for backhaul control signaling. Particularly, a RS backhaul link protocol stack 11a of the RS 21, comprising a PHY layer, a MAC layer, a RLC layer, a PDCP layer, a RRC layer and a S1-AP layer, is used for facilitating the routing control signaling messages with a BS access link protocol stack 12a of the BS 23, comprising a PHY layer, a MAC layer, a RLC layer, a PDCP layer, a RRC layer and a S1-AP layer. A BS backhaul link 13a of the BS 23, comprising an L1 layer, an L2 layer, an IP layer, a SCTP layer and a S1-AP layer, is used for facilitating the routing control signaling messages with a CN link protocol stack 14a of the CN 25, comprising an L1 layer, an L2 layer, an IP layer, a SCTP layer and a S1-AP layer.

And FIG. 1E represents a pattern of user plane protocol stacks of the network system 2 of the present invention for backhaul control signaling. Specifically, a RS backhaul link protocol stack 15a of the RS 21, comprising a PHY layer, a MAC layer, a RLC layer, a PDCP layer and a GTP-U layer, is used for facilitating the routing packets with a BS access link protocol stack 16a of the BS 23, comprising a PHY layer, a MAC layer, a RLC layer, a PDCP layer and a GTP-U layer. A BS backhaul link 17a of the BS 23, comprising an L1 layer, an L2 layer, an UDP/IP layer and a GTP-U layer, is used for facilitating the routing packets with a CN link protocol stack 18a of the CN 25, comprising an L1 layer, an L2 layer, an UDP/IP layer and a GTP-U layer.

It should be noted that, in the above protocol patterns, the BS 23 can receive S1-AP or X2-AP messages from the RS 21 after the RS 21 establishes a control plane during the establishment of EPS bearers between the RS 21 and the CN 25. Moreover, the S1-AP or X2-AP message can be loaded on a signaling radio bearer (SRB).

Figure 1F:
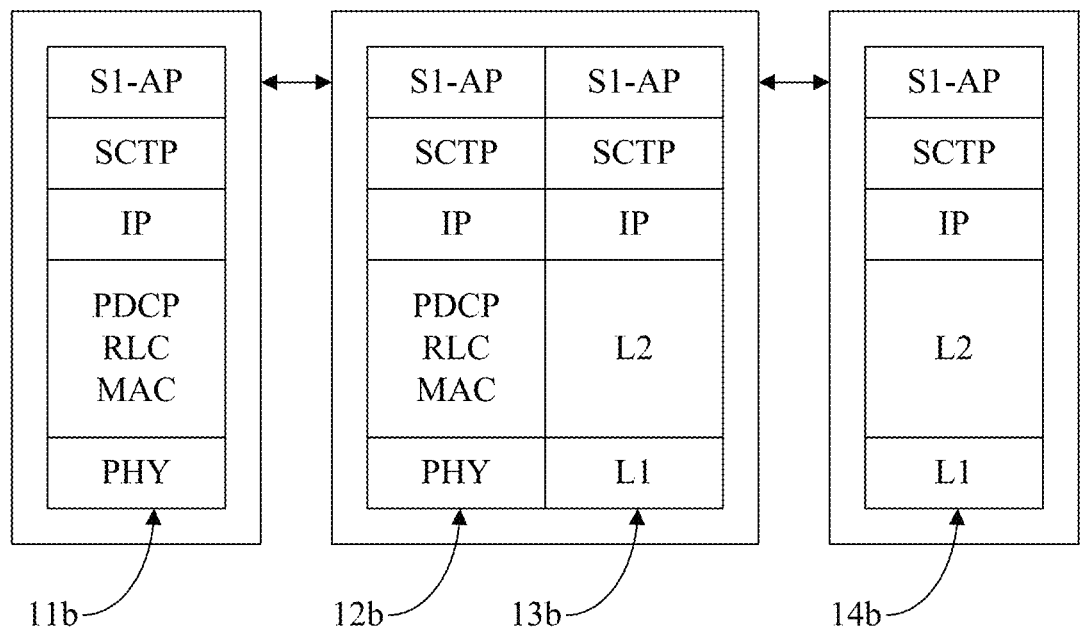
FIG. 1F illustrates another pattern of control plane protocol stacks of the network system of the first example embodiment.
Figure 1G:
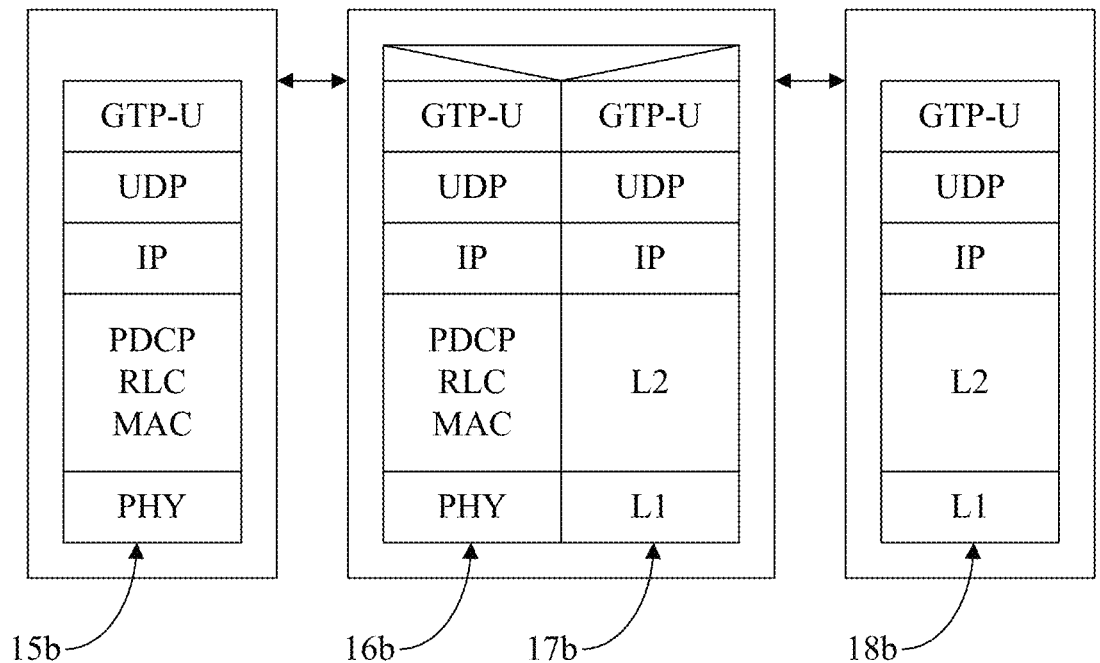
FIG. 1G illustrates another pattern of user plane protocol stacks of the network system of the first example embodiment.

Similarly, please refer to FIGS. 1F and 1G at the same time, other protocol stacks used in the first example embodiment. FIG. 1F represents another pattern of control plane protocol stack of the network system 2 of the present invention for backhaul control signaling. Particularly, a RS backhaul link protocol stack 11b of the RS 21, comprising a PHY layer, a PDCP/RLC/MAC layer, a IP layer, a SCTP and a S1-AP layer, is used for facilitating the routing control signaling messages with a BS access link protocol stack 12b of the BS 23, a PHY layer, a PDCP/RLC/MAC layer, a IP layer, a SCTP and a S1-AP layer. A BS backhaul link 13b of the BS 23, comprising an L1 layer, an L2 layer, an IP layer, a SCTP layer and a S1-AP layer, is used for facilitating the routing control signaling messages with a CN link protocol stack 14b of the CN 25, comprising an L1 layer, an L2 layer, an IP layer, a SCTP layer and a S1-AP layer.

And FIG. 1G represents another example pattern of user plane protocol stacks of the network system 2 of the present invention for backhaul control signaling. Specifically, a RS backhaul link protocol stack 15b of the RS 21, comprising a PHY layer, a PDCP/RLC/MAC layer, an IP layer, an UDP layer and a GTP-U layer, is used for facilitating the routing packets with a BS access link protocol stack 16b of the BS 23, comprising a PHY layer, a PDCP/RLC/MAC layer, an IP layer, an UDP layer and a GTP-U layer. A BS backhaul link 17b of the BS 23, comprising an L1 layer, an L2 layer, an UDP/IP layer and a GTP-U layer, is used for facilitating the routing packets with a CN link protocol stack 18a of the CN 25, comprising an L1 layer, an L2 layer, an UDP/IP layer and a GTP-U layer.

Similarly, it should be noted that, in the above protocols patterns, the BS 23 can receive S1-AP or X2-AP messages from the RS 21 after the RS 21 establishes a user plane during the establishment of EPS bearers between the RS 21 and the CN 25. And the S1-AP or X2-AP messages can be loaded on a data radio bearer (DRB)

Furthermore, if the network system 2 conforms to the protocol stacks described in the FIGS. 1F and 1G, it means that the BS 23 may further use the S1 proxy module 237 for updating control signaling messages and network packets between the RS 21 and the CN 25. In other words, the S1 proxy module 237 will process the network packets before forwarding them between the RS 21 and the CN 25. As the result, the sizes of control signaling messages and network packets will not increase since concatenated relay can cause the incensement of the sizes of the network packets.

Next, after building up the IP link, the transceiver 235 of the BS 23 receives a S1 interface request message 214 from the RS 21. Afterwards, the S1 proxy module 237 updates the S1 interface request message 214 and then the transceiver 235 of the BS 23 forwards the updated S1 interface request message 264 to the second MME 255 of the CN 25. After the second MME 255 of the CN 25 receives the S1 interface request message 264, the BS 23 receives a S1 interface response message 252 transmitted from the second MME 255 of the CN 25 according to the S1 interface request message 214. Similarly, the S1 proxy module 237 updates the S1 interface response message 252 and then the transceiver 235 of the BS 23 forwards the updated S1 interface response message 262 to the RS 21.

It should be noted that, after building the IP link, X2 interface can be set up between the RS 21 and the BS 23. Particularly, after building up the IP link, the transceiver 235 of the BS 23 receives a X2 interface request message 216 from the RS 21 for setting up X2 interface between the RS 21 and the BS 23. After receiving the X2 interface request message 216, the BS 23 transmits a X2 interface response message 236 to the RS 21. It should be appreciated that, in other example embodiments, the orders of setting up the X2 interface and the S1 interface can be rearranged; it is not limiting of the setting order. It is known by the people skilled in this field.

Based on the description above, the communication link procedure between the RS 21 and the CN 25 has been established. However, there should be a mechanism of maintaining the correctness of the communication link between the RS 21 and the CN 25. A mechanism of maintaining the communication link will be introduced hereinafter.

Figure 1H:
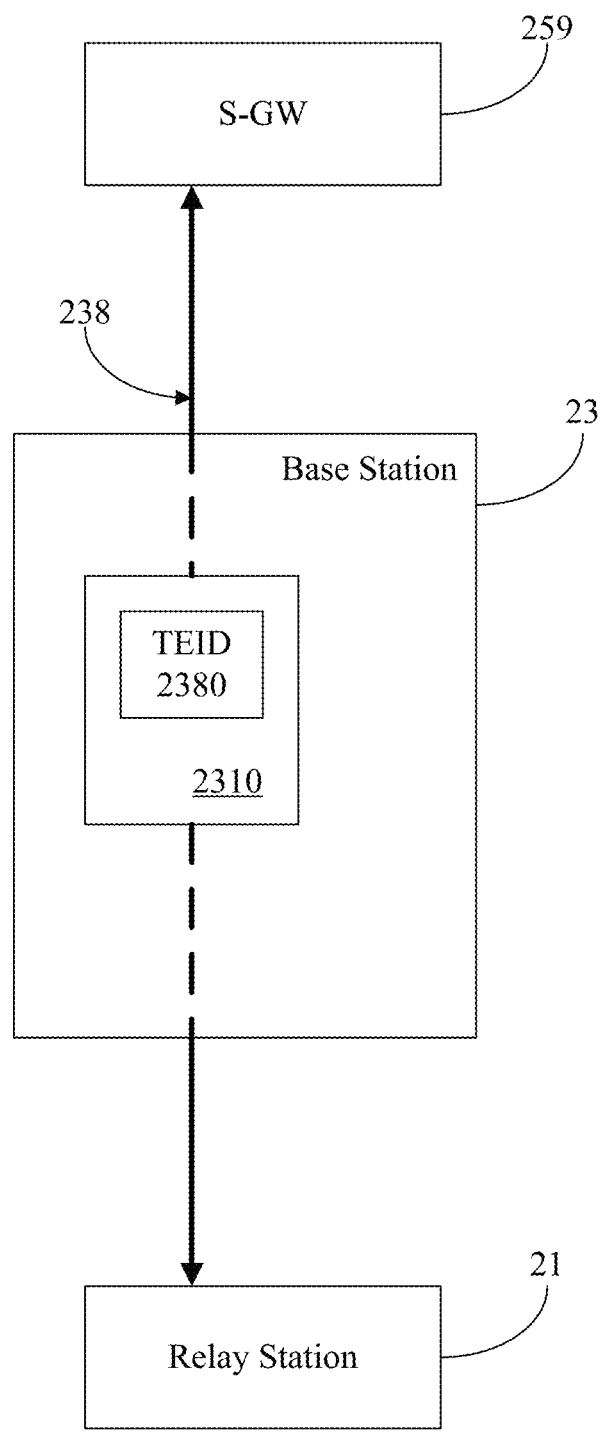
FIG. 1H illustrates a schematic view of a mapping way used in the base station of the first example embodiment.

Please then refer to FIG. 1H, it shows a mechanism of maintaining the link between the RS 21 and the CN 25 in the first example embodiment. The processing unit 231 of the BS 23 sets up a GPRS tunneling protocol for user plane (GTP-U) connection 238 between the RS 21 and the S-GW 259 of the CN 25. Following, the processing unit 231 of the BS 23 assigns the GTP-U connection 238 an identifier 2380 which can be a tunnel endpoint identifier (TEID), and create a mapping table 2310 for recording the identifier 2380 which represents that the GTP-U connection 238 is established for the communication between the RS 21 and the S-GW 259 of the CN 25. The mapping table 2310 is stored in the memory 233. Hence, it is obvious that the purpose of the identifier 2380 is for identifying that the GTP-U connection 238 is for communicating the RS 21 and the S-GW 259 of the CN 25. Therefore, network packets between the RS 21 and the S-GW 259 of the CN 25 can be transmitted correctly via the BS 23 based on the identifier 2380 recorded in the mapping table 2310.

A second example embodiment of the present invention is also the network system 2. Similarly, a communication link procedure in the second embodiment is the same as the communication link procedure described in the first example embodiment; hence, the details will be not further described again. The difference between the first example embodiment and the second example embodiment is the mapping procedure after establishing the communication link.

Figure 1I:
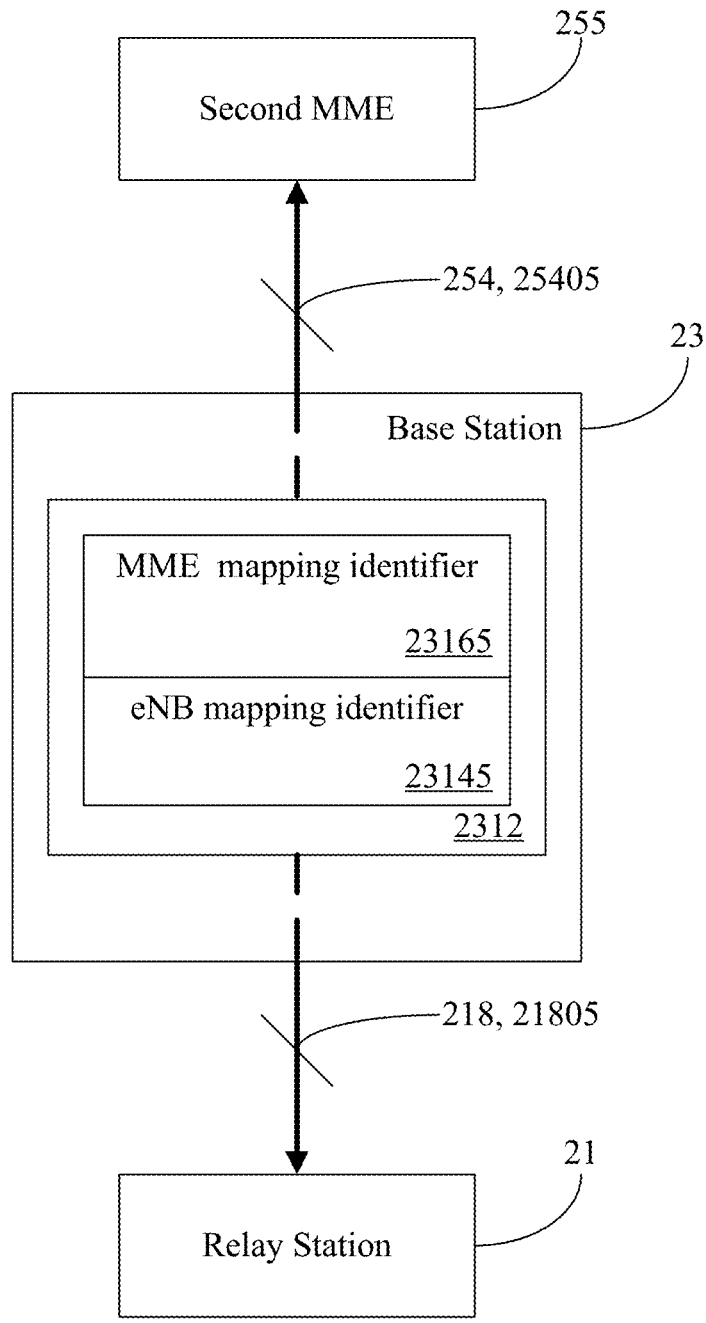
FIG. 1I illustrates a schematic view of another mapping way used in the base station of the first example embodiment.

Please refer to FIG. 1I. Particularly, after establishing the communication link between the RS 21 and the CN 25, the transceiver 235 of the BS 23 receives an uplink S1-AP message 218 from the RS 21 and receives a downlink S1-AP message 254 from the second MME 255 of the CN 25. The uplink S1-AP message 218 comprises at least an eNB S1-AP identifier 21805 and the downlink S1-AP message 254 comprises at least a MME S1-AP identifier 25405. Then the processing unit 231 of the BS 23 allocates a eNB mapping identifier 23145 for the RS 21 to communicate with the second MME 255 of the CN 25 via the BS 23 and allocates a MME mapping identifier 23165 for the second MME 255 of the CN 25 to communicate with the RS 21. Afterwards, the processing unit 231 of the BS 23 creates a mapping table 2312 for recoding the eNB mapping identifier 23145 and the MME mapping identifier 23165. The mapping table 2312 is stored in the memory 233. Accordingly, the BS 23 can connect the RS 21 and the second MME 255 of the CN 25 by mapping the eNB mapping identifier 23145 with the eNB S1-AP identifier 21805 and mapping the MME mapping identifier 23165 with the eNB S1-AP identifier 25405.

More specifically, when the transceiver 235 of the BS 23 receives the uplink S1-AP message 218 from the RS 21, the processing unit 231 of the BS 23 at least maps the eNB S1-AP identifier 21805 to the eNB mapping identifier 23145 so that the BS 23 can forward the uplink S1-AP message 218 from the RS 21 to the second MME 255 of the CN 25 indirectly. Similarly, when the transceiver 235 of the BS 23 receives the downlink S1-AP message 254 from the MME 255 of the CN 25, the processing unit 231 of the BS 23 at least maps the MME S1-AP identifier 25405 to the MME mapping identifier 23165 so that the BS 23 can forward the downlink S1-AP message 254 from the second MME 255 of the CN 25 to the RS 21 indirectly.

Furthermore, the RS 21 communicates with the BS 23 according to the MME mapping identifier 23165 and eNB S1-AP identifier 21805. Then, when the transceiver 235 of the BS 23 receives the uplink S1-AP message 218 from the RS 21, the processing unit 231 of the BS 23 maps both the eNB S1-AP identifier 21805 to the eNB mapping identifier 23145 and maps the MME mapping identifier 23165 to the MME S1-AP identifier 25405 if the MME mapping identifier 23165 exists in the uplink S1-AP message 218. Hence, the BS 23 can forward the uplink S1-AP message 218 from the RS 21 to the second MME 255 of the CN 25 indirectly. Similarly, the second MME 255 of the CN 25 communicates with the BS 23 according to the MME S1-AP identifier 25405 and the eNB mapping identifier 23145. Then, when the transceiver 235 of the BS 23 receives the downlink S1-AP message 254 from the MME 255 of the CN 25, the processing unit 231 of the BS 23 maps both the eNB mapping identifier 23145 to the eNB S1-AP identifier 21805 and maps MME S1-AP identifier 25405 to the MME mapping identifier 23165 if the eNB mapping identifier 23145 exists in the downlink S1-AP message. Hence, the BS 23 can forward the downlink S1-AP message 254 from the second MME 255 of the CN 25 to the RS 21 indirectly. Therefore, the control signaling messages between the RS 21 and the second MME 255 can be transmitted correctly via the BS 23 based on the identifiers (e.g. eNB mapping identifier 23145 and MME mapping identifier 23165) recorded in the mapping table 2312.

Figure 1J:
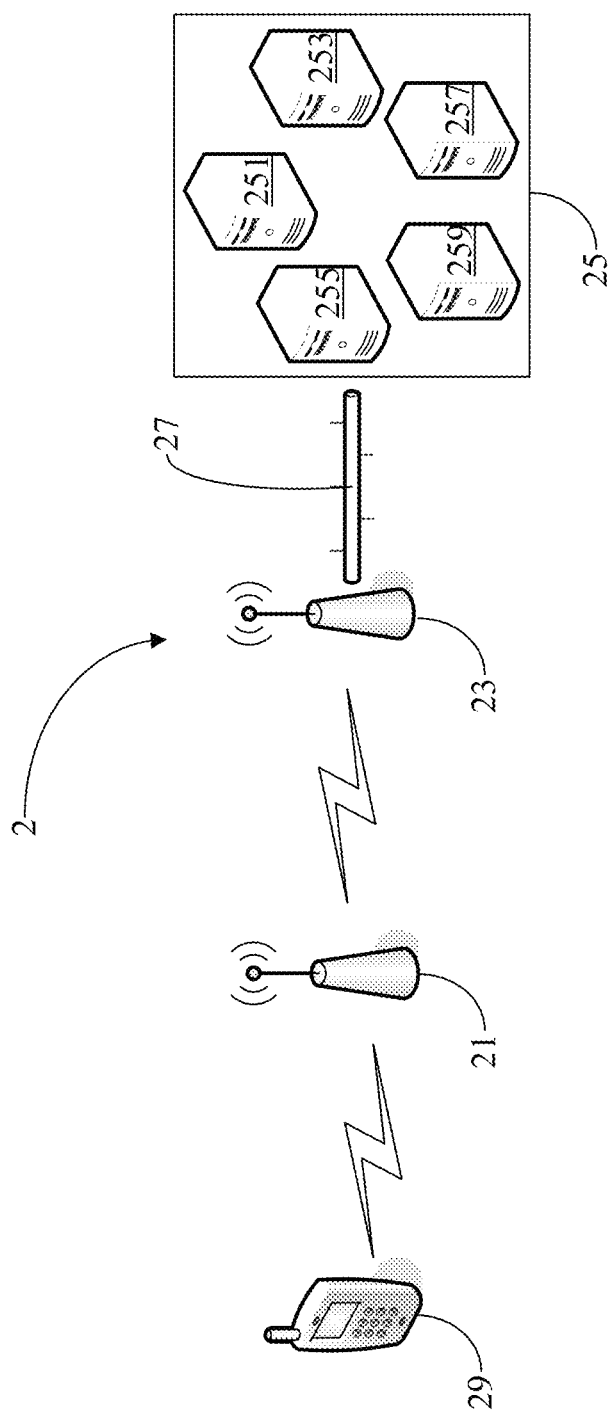
FIGS. 1J-1K illustrate a schematic view of other devices intend to connect to the network system.

It should be appreciated that, the first MME 251 could be introduced for the different types of the devices which intend to attach the network system 2. Please refer to FIG. 1J first.

Particularly, if there is a user equipment 29 intends to attach with the RS 21, in order to provide the mapping mechanism, only the second MME 255 of the CN 25 which supporting user equipments is necessary.

Figure 1K:
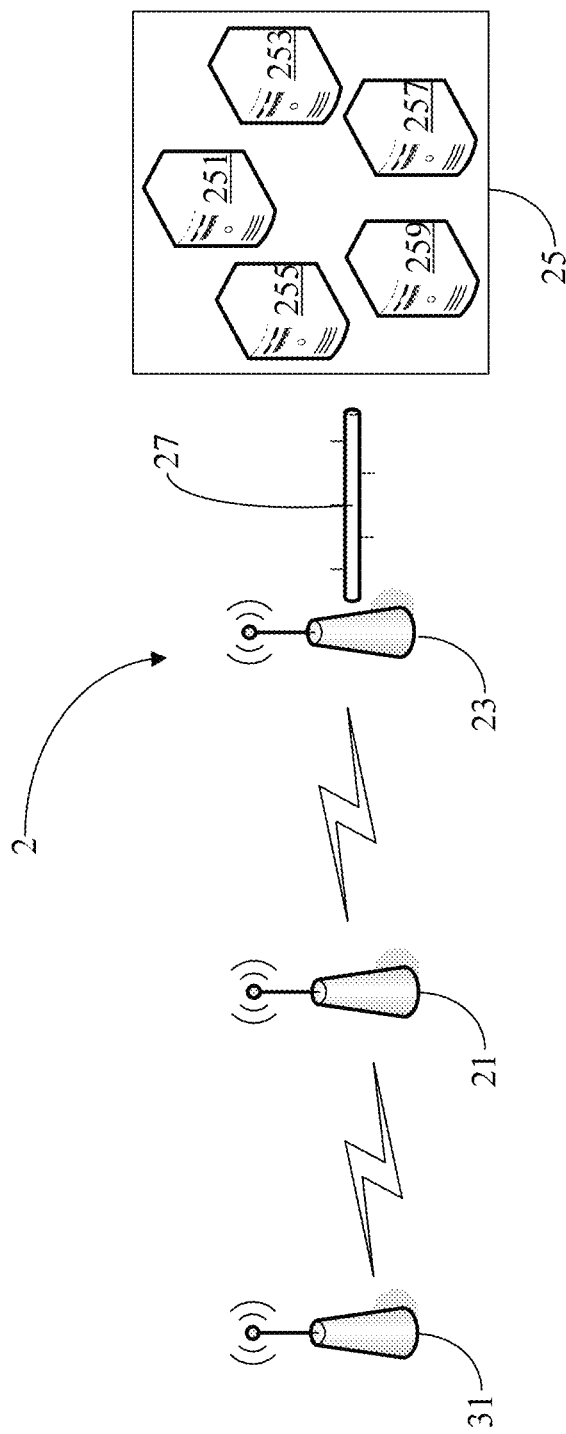

On the other hand, please refer to FIG. 1K, if there is another relay station 31 intends to attach with the RS 21, there should be extra MME, the first MME 251, for multi-hop connections to provide the mapping mechanism. Specifically, the second MME 255 of the CN 25 is used for the connections of the RS 21 and the UE 29, and the first MME 251 is used for the connections of the RS 21 and 31. It should be noted that, when the RS 31 intends to attach with the RS 21, the RS 31 sets up a communication link procedure with the CN 25 via the RS 21 and the BS 23 based on the above concepts of the present invention; hence, the details of the attachment will not be further described. However, it is not intended to limit the functionalities of the MME in the present invention. Persons skilled in the art should know that there can be more than one user equipment, more than one relay station for multi-hop communication, or even both one user equipment and one relay station in the network system at the same time. Accordingly, the MME introduced in the present invention can support various devices which intend to connect to the network system.

Accordingly, based on the disclosure in the second example embodiment of the present invention, BSs can map the identifier from different apparatus so that the apparatus in different communication stages can have the same identifier value. Therefore, memory usage caused by the identifier issue can be reduced efficiently.

A third example embodiment of the present invention is an attaching method for use in a base station (BS), such as the BS 23 in a network system. The network system comprises a relay station (RS), the BS, and a core network (CN). The BS is connected to the CN via a backhaul link. It should be noted that, for the convenience to understand the present invention more clearly, it is presumed that the network system conforms to the long term evolution (LTE) standard. For example, in this example embodiment, the BS may be a donor evolved Node B, the RS may be named a relay node (RN) or a Relay E-UTRAN NodeB (Relay eNB or ReNB), and the CN is a Evolved Packet Core (EPC), which may comprise a mobility management entity (MME) which supports relay nodes, a home subscribe server (HSS), a serving gateway (S-GW), an operation and maintenance (O&M) system, and eNB or DeNB. However, it is not intended to limit this invention to any specific environment. It should be noted that different organizations and/or companies name the relay station, base station, and core network of the LTE standard in different ways; hence, the above specific names of the RS 21, BS 23, and CN 25 are not intended to limit the scope of the present invention. FIGS. 2A-2D illustrate the flowcharts of the third example embodiment of the present invention.

First, the attaching method executes step 301 to enable the BS to receive a radio resource control (RRC) request from the RS. Next, step 302 is executes to enable the BS to respond a RRC connection to the RS according to the RRC request. Step 303 is executed to enable the BS to forward a non-access stratum (NAS) attach request from the RS to the MME of the CN. Following, step 304 is executed to enable the BS to setup an authentication link between the RS and the HSS of the CN after step 303. Step 305 is executed to enable the BS to forward a NAS attach accept, which comprises an evolved packet system (EPS) bearer activation request, from the MME of the CN to the RS according to the NAS attach request. Step 306 is executed to enable the BS to forward a NAS attach complete, which comprises an EPS bearer activation response, from the RS to the MME of the CN according to the NAS attach accept. Afterwards, step 307 is executed to enable the BS to setup an internet protocol (IP) link between the RS and the CN. Therefore, step 308 is executed to enable the BS to forward a configuration data from the O&M system of the CN to the RS via the IP link.

Next, step 309 is executed to enable the BS to receive a S1-AP or X2-AP messages via a SRB from the RS after the RS establishes a control plane for backhaul control signaling. Or step 310 is executed to enable the BS to receive a S1-AP or X2-AP messages via a DRB from the RS after the RS establishes a user plane for backhaul control signaling. It should be noted that to execute step 309 and 310 is based on the patterns of the protocol stacks to use the SRB and the DRB described in the first embodiment.

Following, step 311 is executed to enable the BS to receive a S1 interface request message from the RS. And then step 312 is executed to enable the BS to forward the S1 interface request message to the MME of the CN after the S1 proxy updates the S1 interface request message. It should be noted that the S1 proxy of the BS has been discussed in the previous embodiments, the functionalities of the S1 proxy will not be further described hereinafter. Step 313 is then executed to enable the BS to receive a S1 interface response message from the MME of the CN message. And step 314 is executed to enable the BS to transmit the S1 interface response message to the RS according to the S1 interface request message after the S1 proxy updates the S1 message response.

Following, step 315 is executed to enable the BS to receive a X2 interface request message from the RS. Then, step 316 is executed to enable the BS to transmit a X2 interface response message to the RS. It should be noted that steps 315 and 316 can be executed before step 311. The orders of setting up the interface S1 and X2 are not limited.

Based on the steps described above, the BS has done a communication link procedure between the RS and the CN corresponding to a link request from the RS. Afterwards, steps for maintaining the correctness of the communication link between the RS and the CN should be executed.

There are two ways for maintaining the correctness of the communication link. First, please refer to FIG. 2C. After step 316 is executed, step 317 is executed to enable the BS to receive an uplink S1-AP message from the RS. The uplink S1-AP message comprises at least an eNB S1-AP identifier. The step 318 is executed to enable the BS to allocate an eNB mapping identifier for the RS to communicate with the MME of the CN via the BS. Next, step 319 is executed to enable the BS to receive a downlink S1-AP message from the MME of the CN. The downlink S1-AP message comprises at least a MME S1-AP identifier. Step 320 is executed to enable the BS to allocate a MME mapping identifier for the MME of the CN to communicate with the RS via the BS. Afterwards, step 321 is executed to enable the BS to create the mapping table for recording the MME mapping identifier and the eNB mapping identifier and for recording the relationship between mapping identifier and S1-AP identifier. Step 322 is executed to enable the BS to connect the RS and the MME of the CN by mapping the MME mapping identifier with the MME S1-AP identifier and mapping the eNB mapping identifier with the eNB S1-AP identifier. After establishing the above mapping way, step 326 is the executed to enable the BS to forward control signaling messages between the RS and the CN based on the mapping table.

Figure 2A:
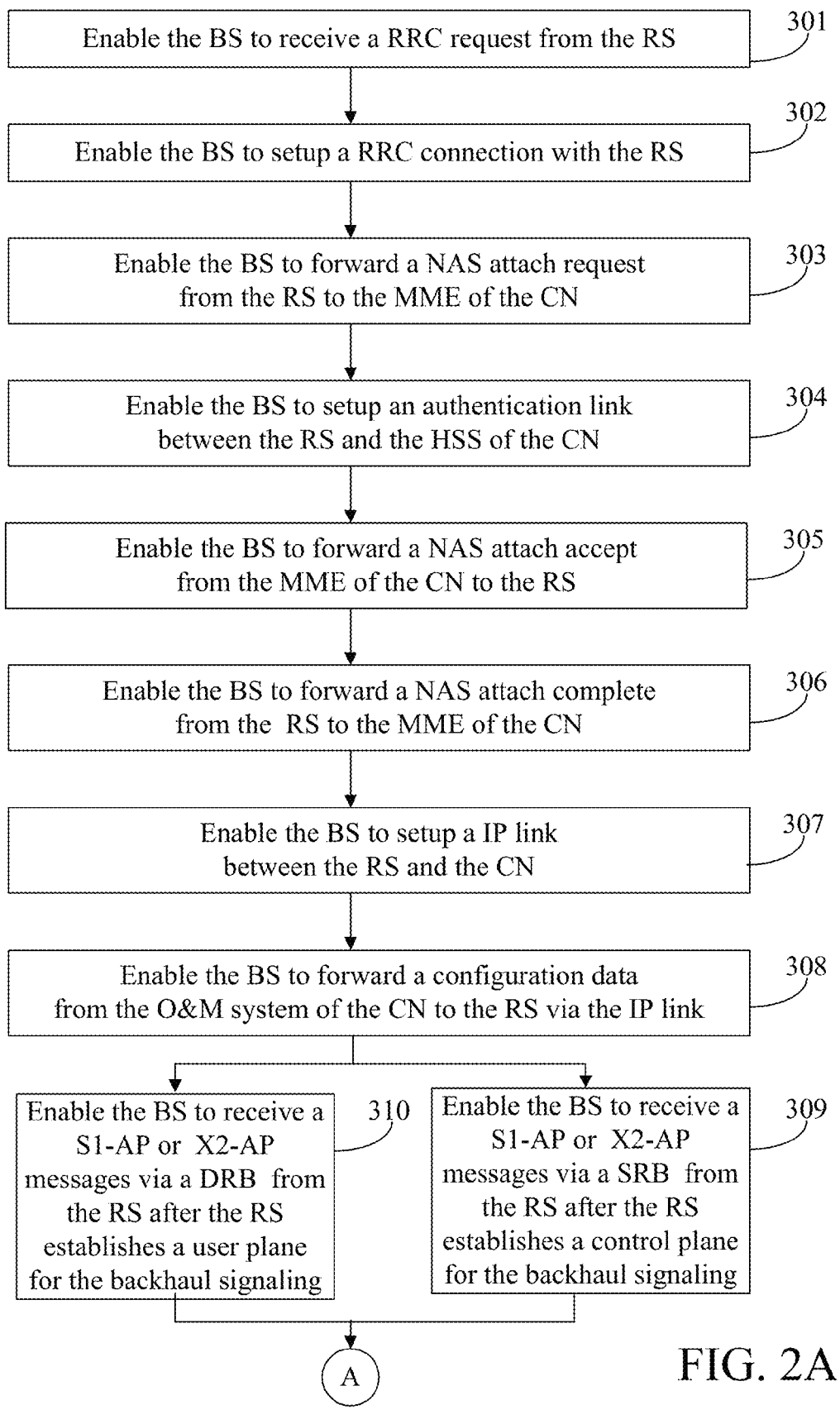
FIGS. 2A-2D illustrate the flowcharts of a third example embodiment of the present invention.
Figure 2B:
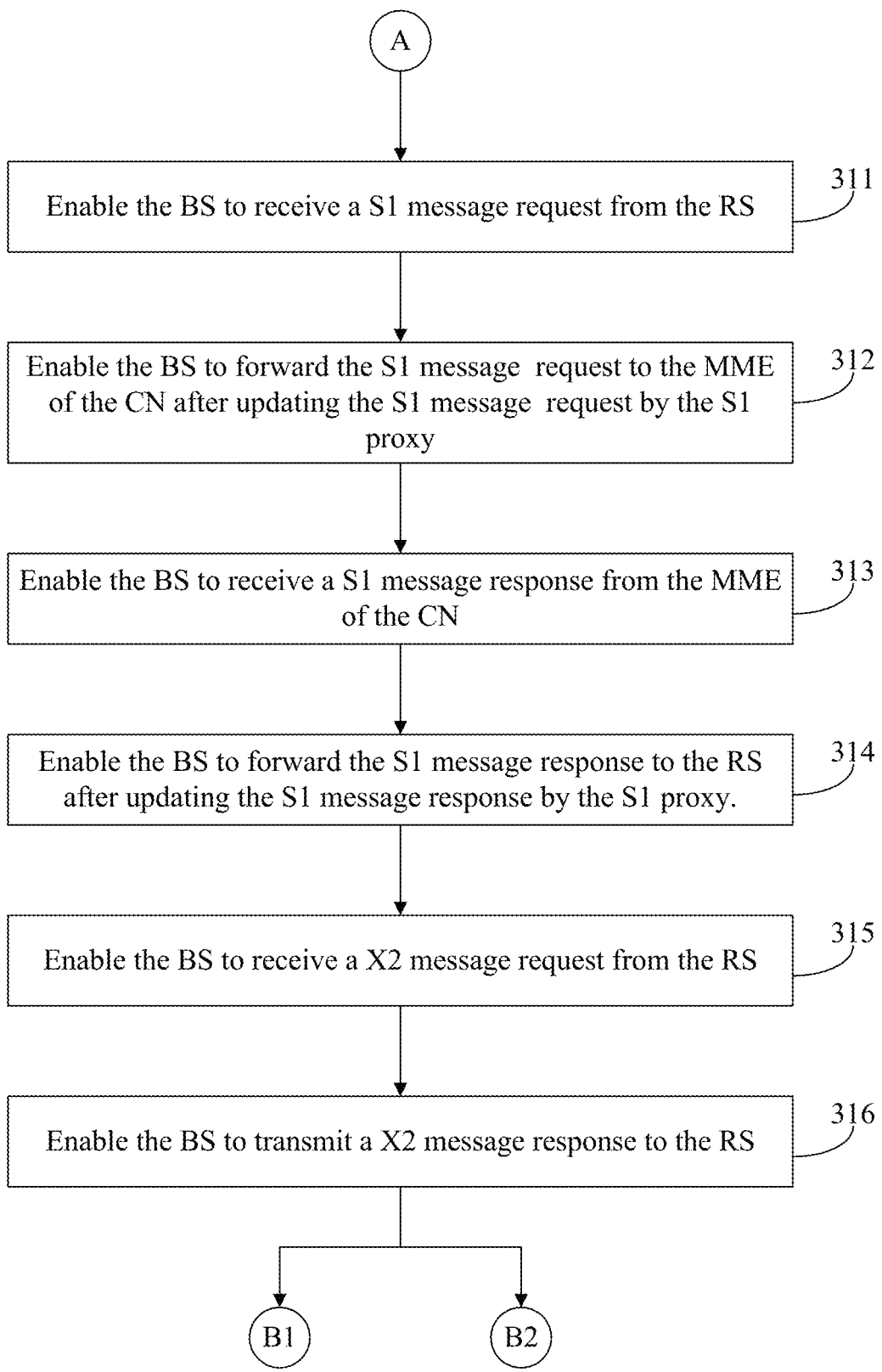
Figure 2C:
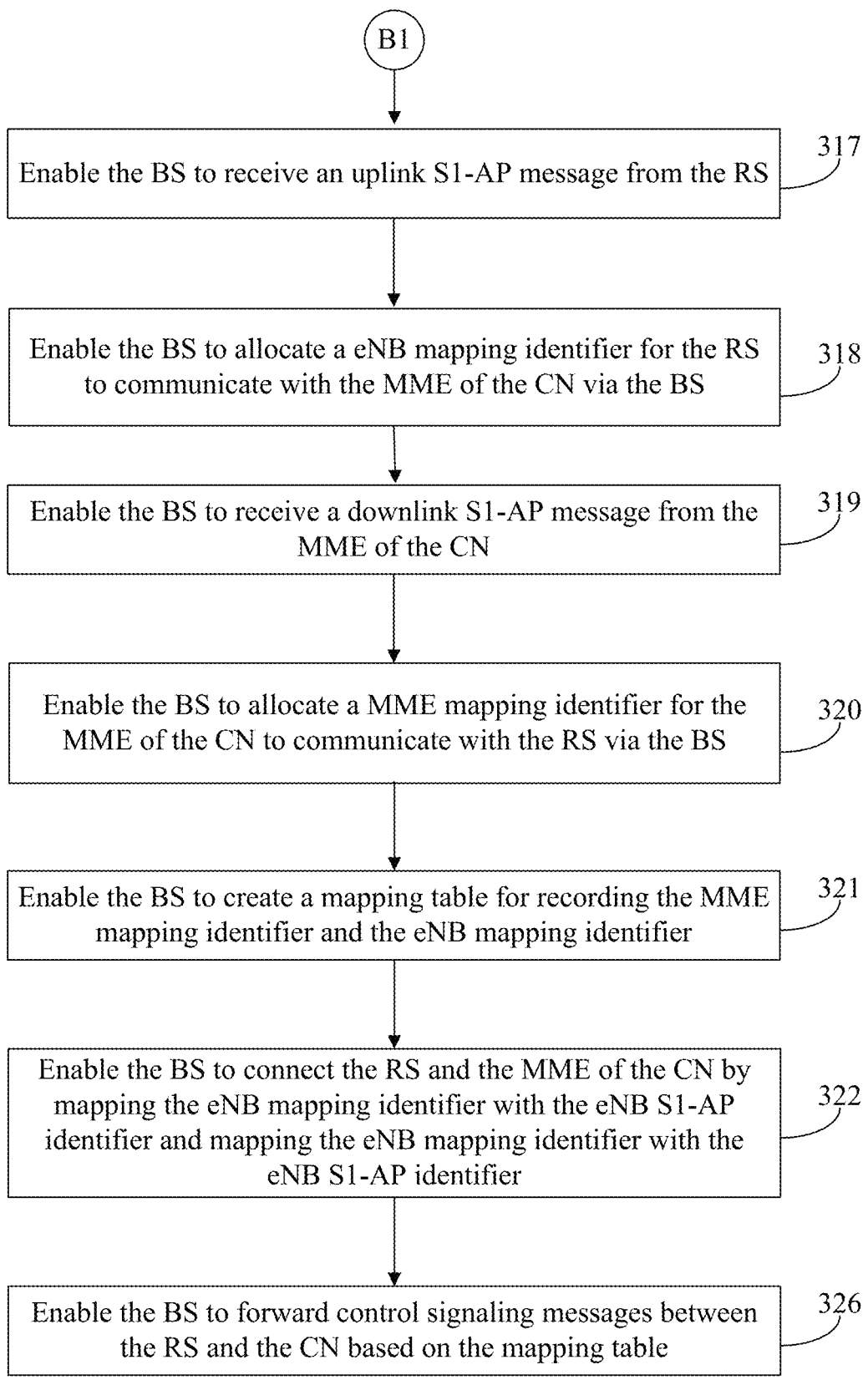
Figure 2D:
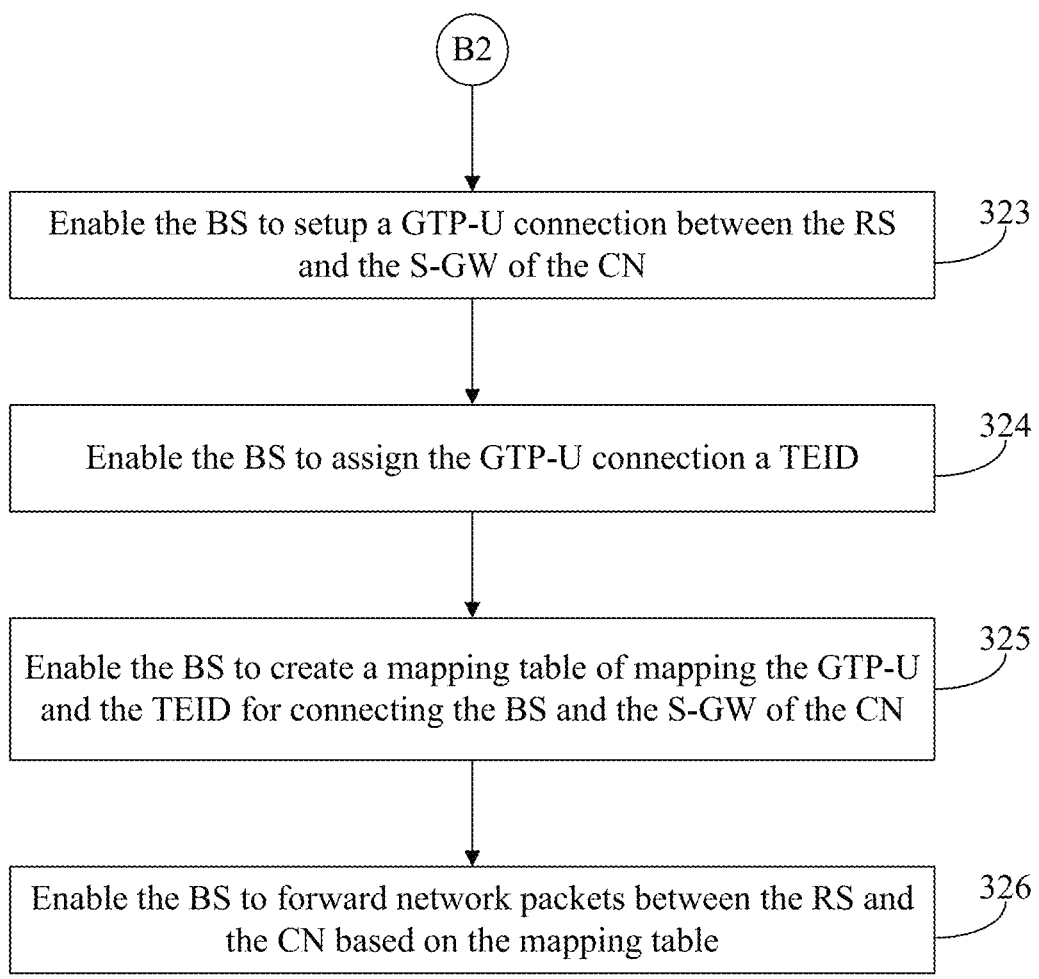

Please refer to FIG. 2D, it illustrates the flowchart of another way for maintaining the correctness of the communication link. During the execution of FIG. 2C, steps 317-326 also provides relevant information to execute FIG. 2D. Similarly, after step 316 is executed, step 323 is executed to enable the BS to setup a GPRS tunneling protocol for user plane (GTP-U) connection between the RS and the S-GW of the CN. Then step 324 is executed to enable the BS to assign the GTP-U connection a tunnel endpoint identifier (TEID). Step 325 is executed to enable the BS to create the mapping table of mapping the GTP-U and the TEID for connecting the BS and the S-GW of the CN. Accordingly, step 326 is executed to enable the BS to forward network packets between the RS and the CN based on the mapping table.

It should be noted that, the people in the field can understand easily that the two flows of the steps 317-322 and the steps 323-325 can be executed simultaneously based on the disclosure of the present invention. It is not intended to limit the present invention to any specific execution order.

In addition to the aforesaid steps, the third example embodiment can also execute all the operations and functions set forth in the first and second example embodiments. How the third example embodiment executes these operations and functions will be readily appreciated by those of ordinary skill in the art based on the explanation of the first and second example embodiments, and thus will not be further described herein.

According to the above descriptions, a base station, an attaching method containing identifying mechanisms of the present invention address the problems caused in the prior art, and improve the efficiency of the communications in the latest network systems.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. An attaching method for use in a base station (BS), the BS being adapted for use in a relay network system, the relay network system comprising the BS, a relay station (RS) and a core network (CN), the BS being connected with the CN via a backhaul link, the network system conforming to long term evolution (LTE) standard, the BS being a donor evolved Node B (eNB), the RS being a relay node (RN), a Relay E-UTRAN NodeB (ReNB) or a relay eNB and the CN being an Evolved Packet Core (EPC) which comprises a serving gateway (S-GW), a home subscribe server (HSS), an operation and maintenance (O&M) system, and a mobility management entity (MME), the attaching method comprising the following steps:
  (a) enabling the BS to setup a communication link procedure between the RS and the CN corresponding to a link request from the RS;
  (b1) enabling the BS to create a mapping table of mapping a GPRS tunneling protocol for user plane (GTP-U) connection and a tunnel endpoint identifier (TEID) for connecting the RS and the S-GW of the CN after step (a);
  (b2) enabling the BS to, after step (a), record an MME mapping identifier, an eNB mapping identifier and relation between an MME S1-AP identifier and an eNB S1-AP identifier in the mapping table, and connect the RS and the MME of the CN by mapping the eNB mapping identifier with the eNB S1-AP identifier and mapping the MME mapping identifier with the MME S1-AP identifier, wherein the eNB S1-AP identifier is comprised in an uplink S1-AP message from the RS and the MME S1-AP identifier is comprised in a downlink S1-AP message from the MME of the CN;
  (c) enabling the BS to receive and forward network packets and control signals between the RS and the CN based on the mapping table.

2. The attaching method as claimed in claim 1, wherein step (a) further comprises:
  (a1) enabling the BS to receive a radio resource control (RRC) request from the RS;
  (a2) enabling the BS to respond a RRC connection to the RS according to the RRC request;
  (a3) enabling the BS to forward a non-access stratum (NAS) attach request from the RS to the MME of the CN after step (a2);
  (a4) enabling the BS to setup an authentication link between the RS and the HSS of the CN after step (a3);
  (a5) enabling the BS to forward a NAS attach accept, which comprises an evolved packet system (EPS) bearer activation request, from the MME of the CN to the RS according to the NAS attach request;
  (a6) enabling the BS to forward a NAS attach complete, which comprises an EPS bearer activation response, from the RS to the MME of the CN according to the NAS attach accept;
  (a7) enabling the BS to setup a internet protocol (IP) link between the RS and the CN after step (a6); and
  (a8) enabling the BS to forward a configuration data from the O&M system of the CN to the RS via the IP link.

3. The attaching method as claimed in claim 2, further comprising the following step after step (a6):
  (a9) enabling the BS to receive a S1-AP or X2-AP message via a signaling radio bearer (SRB) from the RS after the RS establishes a control plane for backhaul control signaling.

4. The attaching method as claimed in claim 2, further comprising the following step after step (a6):
  (a9) enabling the BS to receive a S1-AP or X2-AP message via a data radio bearer (DRB) from the RS after the RS establishes a user plane for backhaul control signaling.

5. The attaching method as claimed in claim 2, wherein the BS further comprises a S1 proxy module, and the attaching method further comprises the following steps after step (a8):
  (a9) enabling the BS to receive a S1 interface request message from the RS;
  (a10) enabling the BS to forward the S1 interface request message to the MME of the CN after the S1 proxy module updates the S1 interface request message;
  (a11) enabling the BS to receive a S1 interface response message from the MME of the CN according to the S1 interface request message; and
  (a12) enabling the BS to forward the S1 interface response message to the RS after the S1 proxy module updates the S1 interface response message.

6. The attaching method as claimed in claim 2, further comprising the following steps after step (a8):
  (a9) enabling the BS to receive an X2 interface request message from the RS; and
  (a10) enabling the BS to transmit an X2 interface response message to the RS according to the X2 interface request message.

7. The attaching method as claimed in claim 1, wherein step (b1) further comprises:
  (b11) enabling the BS to setup the GTP-U connection between the RS and the S-GW of the CN;
  (b12) enabling the BS to assign the GTP-U connection the; and (b13) enabling the BS to create the mapping table of mapping the GTP-U and the TEID for connecting the RS and the S-GW of the CN.

8. The attaching method as claimed in claim 1, wherein step (b2) further comprises:
(b21) enabling the BS to receive the uplink S1-AP message from the RS;
(b22) enabling the BS to allocate the eNB mapping identifier for the RS to communicate with the MME of the CN via the BS;
(b23) enabling the BS to receive the downlink S1-AP message from the MME of the CN;
(b24) enabling the BS to allocate the MME mapping identifier for the MME of the CN to communicate with the RS via the BS;
(b25) enabling the BS to record the MME mapping identifier, the eNB mapping identifier and the relations of the related MME S1-AP identifier and the eNB S1-AP identifier in the mapping table; and
(b26) enabling the BS to connect the RS and the MME of the CN by mapping the eNB mapping identifier with the eNB S1-AP identifier and mapping the MME mapping identifier with the MME S1-AP identifier.

9. A base station (BS) for use in a relay network system, the relay network system comprising the BS, a relay station (RS) and a core network (CN), the BS being connected with the CN via a backhaul link, the network system conforming to long term evolution (LTE) standard, the BS being a donor evolved Node B (eNB), the RS being a relay node (RN), a Relay E-UTRAN NodeB (ReNB) or a relay eNB and the CN being an Evolved Packet Core (EPC) which comprises a serving gateway (S-GW), a home subscribe server (HSS), an operation and maintenance (O&M) system, and a mobility management entity (MME), the BS comprising:
a processing unit being configured to setup a communication link procedure between the RS and the CN corresponding to a link request from the RS, and to create a mapping table of mapping a GPRS tunneling protocol for user plane (GTP-U) connection and the a tunnel endpoint identifier (TEID) for connecting the RS and the S-GW of the CN, recording an MME mapping identifier and an eNB mapping identifier in the mapping table, and connecting the RS and the MME of the CN by mapping the eNB mapping identifier with the eNB S1-AP identifier and mapping the MME mapping identifier with the MME S1-AP identifier, wherein the eNB S1-AP identifier is comprised in an uplink S1-AP message from the RS and the MME S1-AP identifier is comprised in a downlink S1-AP message from the MME of the CN;
a memory being configured to stored the mapping table; and
a transceiver being configured to receive and forward network packets and control signals between the RS and the CN based on the mapping table.

10. The BS as claimed in claim 9, wherein the transceiver is further configured to receive a radio resource control (RRC) request from the RS, the processing unit is further configured to respond a RRC connection to the RS according to the RRC request, the transceiver is further configured to forward a non-access stratum (NAS) attach request from the RS to the MME of the CN after the RRC connection is set up, and to forward a NAS attach accept, which comprises an evolved packet system (EPS) bearer activation request, from the MME of the CN to the RS according to the NAS attach request, and to forward a NAS attach complete, which comprises an EPS bearer activation response, from RS to the MME of the CN according to the NAS attach accept, the processing unit is further configured to setup an authentication link between the RS and the HSS of the CN after the transceiver forwards the NAS attach accept from the RS to the MME of the CN, and the processing unit is configured to setup a internet protocol (IP) link between the RS and the CN after the transceiver forwards the NAS attach complete from the RS to the MME of the CN, and the transceiver is further configured to forward a configuration data from the O&M system of the CN to the RS via the IP link.

11. The BS as claimed in claim 10, wherein the transceiver is further configured to receive a S1-AP or X2-AP message via a signaling radio bearer (SRB) from the RS after the RS establishes a control plane for backhaul control.

12. The BS as claimed in claim 10, wherein the transceiver is further configured to receive a S1-AP or X2-AP message via a data radio bearer (DRB) from the RS after the RS establishes a user plane.

13. The BS as claimed in claim 10, wherein the BS further comprises a S1 proxy module, the transceiver is further configured to receive a S1 interface request message from the RS and to forward the S1 interface request message to the MME of the CN after the S1 proxy module updates the S1 interface request message, and the transceiver is further configured to receive a S1 interface response message from the MME of the CN according to the S1 interface request message and to forward the S1 interface response message to the RS after the S1 proxy module updates the S1 interface response message.

14. The BS as claimed in claim 10, wherein the transceiver is further configured to receive a X2 interface request message from the RS and to transmit a X2 interface response message to the RS according to the X2 interface request message.

15. The BS as claimed in claim 9, wherein the processing unit is further configured to setup the GTP-U connection between the RS and the S-GW of the CN, to assign the GTP-U connection a TEID, and to create the mapping table of mapping the GTP-U and the TEID for connecting the BS and the S-GW of the CN.

16. The BS as claimed in claim 9, wherein the transceiver is further configured to receive the uplink S1-AP message from the RS and to receive the downlink S1-AP message from the MME of the CN, the processing unit is further configured to allocate the eNB mapping identifier for the RS to communicate with the MME of the CN via the BS, to allocate the MME mapping identifier for the MME of the CN to communicate with the RS via the BS, to record the MME mapping identifier and the eNB mapping identifier in the mapping table, and to connect the RS and the MME of the CN by mapping the eNB mapping identifier with the eNB S1-AP identifier and mapping the MME mapping identifier with the MME S1-AP identifier.

\* \* \* \* \*